United States Patent
Dickey et al.

(10) Patent No.: US 7,212,375 B2
(45) Date of Patent: May 1, 2007

(54) AUTOMATED STORAGE LIBRARY GRIPPER APPARATUS AND METHOD

(75) Inventors: Peter Dickey, Costa Mesa, CA (US); Raoul Standt, Newport Beach, CA (US)

(73) Assignee: Quantum Corporation, San Jose, CA (US)

( * ) Notice: Subject to any disclaimer, the term of this patent is extended or adjusted under 35 U.S.C. 154(b) by 534 days.

(21) Appl. No.: 10/641,969

(22) Filed: Aug. 15, 2003

(65) Prior Publication Data

US 2005/0036231 A1 Feb. 17, 2005

(51) Int. Cl.
*G11B 15/68* (2006.01)
(52) U.S. Cl. .................... 360/92; 369/30.43
(58) Field of Classification Search ..... 294/106–119.1; 901/30–47; 360/92; 369/30.43
See application file for complete search history.

(56) References Cited

U.S. PATENT DOCUMENTS

| | | | | |
|---|---|---|---|---|
| 3,934,917 A | * | 1/1976 | Paxton et al. | 294/68.23 |
| 4,286,380 A | | 9/1981 | Blount | |
| 4,544,193 A | * | 10/1985 | Dunn et al. | 294/86.4 |
| 4,573,727 A | * | 3/1986 | Iikura | 294/115 |
| 4,903,252 A | * | 2/1990 | Tanaka et al. | 369/30.43 |
| 4,945,430 A | | 7/1990 | Konishi et al. | |
| 5,022,019 A | * | 6/1991 | Motoyoshi et al. | 369/30.43 |
| 5,036,503 A | * | 7/1991 | Tomita | 369/30.43 |
| 5,237,467 A | | 8/1993 | Marlowe | |
| 5,253,911 A | | 10/1993 | Egan et al. | |
| 5,353,179 A | * | 10/1994 | Elliott et al. | 360/92 |
| 5,402,283 A | * | 3/1995 | Yamakawa et al. | 360/92 |
| 5,429,470 A | | 7/1995 | Nicol et al. | |
| 5,487,579 A | | 1/1996 | Woodruff | |
| 5,498,116 A | * | 3/1996 | Woodruff et al. | 414/331.05 |
| 5,578,268 A | * | 11/1996 | Champseix et al. | 422/63 |
| 5,581,522 A | * | 12/1996 | Sibuya et al. | 360/92 |
| 5,601,391 A | * | 2/1997 | Gazza | 414/280 |
| 5,607,275 A | | 3/1997 | Woodruff et al. | |
| 5,659,434 A | * | 8/1997 | Yamakawa et al. | 360/69 |
| 5,691,859 A | | 11/1997 | Ulrich et al. | |
| 5,781,517 A | * | 7/1998 | Nakajima | 369/30.43 |
| 5,805,561 A | * | 9/1998 | Pollard | 369/30.43 |
| 5,820,055 A | | 10/1998 | Leger et al. | |
| 5,848,872 A | | 12/1998 | Manes et al. | |
| 5,966,366 A | * | 10/1999 | Pollard | 369/30.43 |
| 6,104,564 A | | 8/2000 | Shibuya et al. | |
| 6,175,466 B1 | | 1/2001 | Hori et al. | |
| 6,217,094 B1 | | 4/2001 | Hanaduka et al. | |
| 6,233,111 B1 | | 5/2001 | Schneider et al. | |

(Continued)

FOREIGN PATENT DOCUMENTS

JP 09326156 A * 12/1997

(Continued)

*Primary Examiner*—William J Klimowicz
(74) *Attorney, Agent, or Firm*—Morrison & Foerster LLP

(57) ABSTRACT

A mechanical gripper mechanism for transporting and handling storage devices is provided. In one example, the gripper mechanism includes a pair of opposing gripper fingers rotatably mounted to the picker frame, each having a distal end adapted to engage opposite minor side surfaces of a storage device. The opposing gripper fingers are further interconnected by corresponding geared surfaces such that the gripper fingers rotate together. In one example, the proximal ends of the gripper fingers include geared surfaces that are directly coupled to rotate the gripper fingers together.

26 Claims, 7 Drawing Sheets

U.S. PATENT DOCUMENTS

| | | |
|---|---|---|
| 6,236,530 B1 | 5/2001 | Schneider et al. |
| 6,266,316 B1 | 7/2001 | Luffel et al. |
| 6,271,982 B1 | 8/2001 | Helmick |
| 6,385,003 B1 * | 5/2002 | Ellis .......................... 360/92 |
| 6,424,111 B1 * | 7/2002 | Romig ................. 318/568.21 |
| 6,473,261 B1 | 10/2002 | Miller et al. |
| 6,476,999 B1 | 11/2002 | Meikle et al. |
| 6,549,358 B1 | 4/2003 | Billy et al. |
| 6,826,008 B2 * | 11/2004 | Paulat ........................ 360/92 |
| 6,839,198 B2 * | 1/2005 | Shimanuki ................. 360/92 |
| 6,885,515 B2 * | 4/2005 | Steinhilber ................... 360/69 |
| 2002/0084321 A1 | 7/2002 | Johnson et al. |
| 2004/0074328 A1 * | 4/2004 | Kuo ............................ 74/437 |
| 2005/0036407 A1 * | 2/2005 | Dickey et al. ........... 369/30.31 |
| 2005/0036408 A1 * | 2/2005 | Dickey et al. ........... 369/30.36 |
| 2005/0057847 A1 | 3/2005 | Armagost et al. |

FOREIGN PATENT DOCUMENTS

| | | | |
|---|---|---|---|
| JP | 10255359 A | * | 9/1998 |
| JP | 2001344870 A | * | 12/2001 |

\* cited by examiner

AUTOMATED STORAGE LIBRARY GRIPPER APPARATUS AND METHOD

CROSS-REFERENCE TO RELATED APPLICATIONS

The present application is related to co-pending U.S. patent application Ser. No. 10/642,038 entitled "AUTOMATED STORAGE LIBRARY CARTRIDGE GRIPPER WITH CARTRIDGE DETECTOR," filed on Aug. 15, 2003, and U.S. patent application Ser. No. 10/642,032 entitled "AUTOMATED STORAGE LIBRARY GRIPPER WITH FINGER POSITION DETECTOR", filed on Aug. 15, 2003, both of which are hereby incorporated by reference herein in their entirety.

BACKGROUND OF THE INVENTION

1. Field of the Invention

The present invention relates generally to automated storage library gripper mechanisms, and more particularly to gripper mechanisms and methods for detecting and handling storage cartridges, e.g., magnetic tape cartridges, in automated storage libraries.

2. Description of the Related Art

Magnetic tape cartridges have proven to be an efficient and effective medium for data storage in computer systems. Large computer systems may utilize numerous cartridges for data storage purposes as well as a plurality of tape drives for inputting and outputting data to and from storage cartridges in a timely manner. Typically, as the number of storage cartridges grows they are organized in automated storage libraries. Automated storage libraries including magnetic tape cartridges may improve access speed and reliability of data storage systems having large numbers of magnetic tape cartridges.

Automated cartridge libraries generally include a plurality of storage bins or slots for storing library tape cartridges, a robotic cartridge gripping mechanism (often referred to as a "picker"), and one or more tape drives. The robotic picker may be controlled to select a specific storage tape cartridge from the library and transfer the tape cartridge between a storage slot and a tape drive within seconds. The robotic picker typically includes a gripper or hand mechanism positioned on the robotic picker. The robotic picker may position the gripper near a desired tape cartridge and activate the gripper to engage or grip the tape cartridge to remove the cartridge from the storage bin. The robotic arm may move the gripper and tape cartridge to a location to load the tape cartridge into a tape drive, load port (for adding or removing tapes from the library), and the like.

Storage cartridges are typically stored in storage slots stacked within the automated library. The storage cartridges are generally stacked with high density within a storage library housing to increase or maximize the storage capacity for a given size library housing. The density at which the cartridges may be arranged relies, at least in part, on the size and configuration of the gripper mechanism and clearance required to pick a storage cartridge. Typically, a gripper mechanism engages a storage cartridge with opposing gripper fingers on the top and bottom major surfaces of the cartridge. In this instance, storage slots are separated by sufficient distance or clearance for the gripper mechanisms to navigate between neighboring storage cartridges and storage slots during a picking process. The clearance between storage slots results in lower cartridge packing density within the storage library.

Gripper mechanisms may also include protrusions that interact with slots or notches on the cartridge housing. The protrusions may pull (or push) a cartridge in one dimension to remove (or insert) a cartridge from a storage bin or media drive. For example, a storage cartridge is pulled from a storage bin by a protrusion on the gripper mechanism to rest on a platform associated with the robotic picker mechanism for transfer to a media drive or the like.

Generally it is desired that a controller of the gripper mechanism be able to determine at a given time the state of the gripper fingers, e.g., open, closed, properly closed on a cartridge, or partially closed on a cartridge. For example, when a system is initially powered on, the location of the gripper fingers is desirably known so that actuators are directed to position the gripper fingers appropriately. One method for determining the state of gripper fingers includes moving an actuator slowly until it reaches a command current level, e.g., a spike in the current level associated with being in an open or closed position. This method, however, may be incorrect if the gripper fingers or system become jammed mid stroke. Further, the potential for damaging the gripper mechanism increases. Devices, such as limit switches may also be included in the gripper mechanisms, but generally add cost and complexity to the gripper mechanism.

Therefore, what is desired is a gripper mechanism for picking cartridges that allows for increased packing density of storage cartridges within an automated storage library. Further, a system and method for providing information to a gripper positioning controller associated with the state of the gripper mechanism, e.g., open, closed, properly closed on a cartridge, or partially closed on a cartridge, are desired.

BRIEF SUMMARY OF THE INVENTION

In one exemplary embodiment a mechanical gripper mechanism for transporting and handling storage devices is provided. The gripper mechanism includes a pair of opposing gripper fingers rotatably mounted to a picker frame, each having a distal end adapted to engage opposite minor side surfaces of a storage device. The opposing gripper fingers are further interconnected by corresponding geared surfaces such that the gripper fingers rotate together.

In another exemplary embodiment a method for transporting and handling storage devices including opposing gripper fingers is provided. The method includes rotating a pair of opposing gripper fingers to engage opposing minor side surfaces of a storage device, wherein the pair of opposing gripper fingers are rotated together through corresponding geared surfaces associated with each gripper finger.

The present invention and its various embodiments are better understood upon consideration of the detailed description below in conjunction with the accompanying drawings and claims.

DETAILED DESCRIPTION OF THE INVENTION

The following description is presented to enable any person skilled in the art to make and use the invention. Descriptions of specific materials, techniques, and applications are provided only as examples. Various modifications to the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the scope consistent with the appended claims.

In one example, a gripper mechanism is provided for handling and transferring storage cartridges by gripping a cartridge housing by opposing minor side surfaces. The gripper fingers are rotatably attached to a picker frame and are coupled with each other through geared surfaces to open and close together through a single actuator. In another example, the gripper mechanism includes optically detectable indicia associated with opposing gripper fingers, where movement of the gripper fingers moves the optically detectable indicia, e.g., optically detectable indicia attached to a gear of the drive train for opening and closing the gripper fingers. An optical sensor may be used to determine the position of gripper fingers, e.g., open, closed, properly closed on a cartridge, or partially closed on a cartridge based on the optically detectable indicia.

Figure 1:
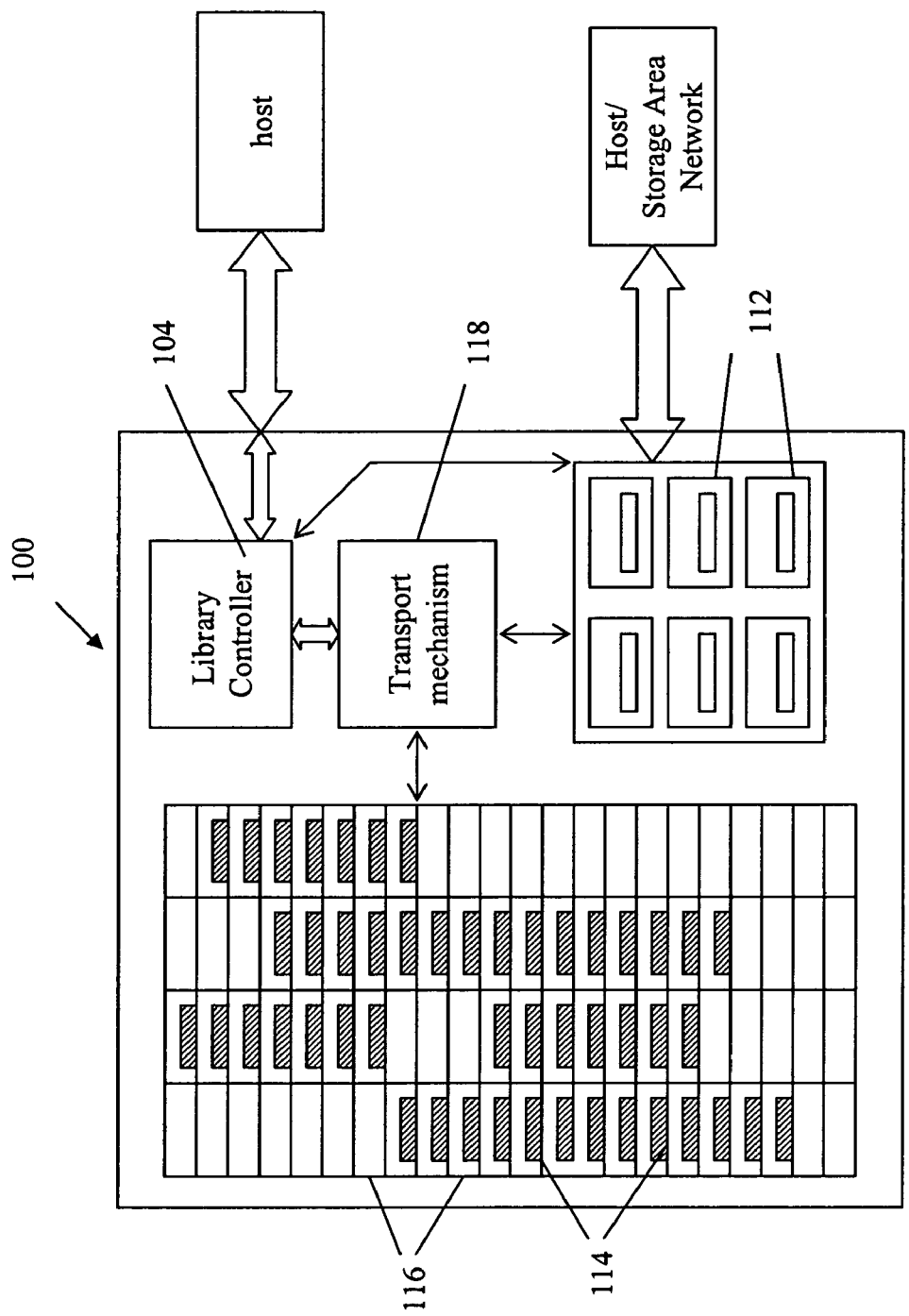
FIG. 1 illustrates an exemplary automated storage library system.

FIG. 1 is a schematic illustration of an exemplary automated storage library system 100 for the storage and retrieval of a plurality of storage cartridges 114 stored therein. Library system 100 includes one or more media drives 112, a plurality of storage tapes or cartridges 114 stored in bins or storage slots 116, and a transport mechanism 118 that may be equipped with a picker mechanism (not shown) for transporting a selected cartridge 114, for example, between a drive 112 and a storage slot 116. Storage library system further includes a library controller 104 that communicates with a host processor or computer network to control the actions of transport mechanism 118 and drives 112 to retrieve and/or store data.

Library controller 104 may include a single general purpose computer, microprocessor, microcontroller, and the like. Alternatively, a separate cartridge loader controller and a library system controller may be included. A general library controller 104, tape cartridge loader controller, or library system controller may include any programmable general purpose computer or processor and preferably will have a suitably programmed microprocessor or microcontroller. The input-output connections between the library controller and various other components of the library system 100 may include well-known industry standard cabling and communication protocols. For example, Ethernet, Inter Integrated Circuit bus (I2C), Small Computer System Interface (SCSI), ultra-wide SCSI, fast SCSI, fibre channel, and the like.

Library controller 104 operates to coordinate movements and actions of media drives 112, robotic transport mechanism 118, and the like. The controller 104 may include a suitable processor as described above and is typically interconnected with a host processor, which sends access commands to controller 104. In this example, information recorded to or read from one or more of the cartridges 114 is transmitted between one of the drives 112 to the host or a storage area network through a second data path connection, e.g., a fibre channel bridge or the like.

Media drives 112 may include, for example, magnetic tape drives and/or optical disk drives, and cartridges 114 may include, for example, magnetic and/or optical storage devices. An exemplary drive includes the SDLT™ 320 magnetic tape drive, and an exemplary storage cartridge includes the Super DLTape™ Type I storage cartridge both sold by Quantum Corporation. The examples described herein are generally described as a magnetic tape library including multiple magnetic tape cartridges. It should be understood, however, that the various embodiments are contemplated with use for other types of storage media and storage media libraries. For example, a storage library may include optical media devices alone or in combination with magnetic media storage devices and the like.

Automated storage library system 100 may further include various other features such as load ports for manually adding and removing cartridges to and from the library, various access doors, control panels, power supplies, and the like as are known in the art. For clarity, however, such additional features have been omitted from the description.

Figure 2:
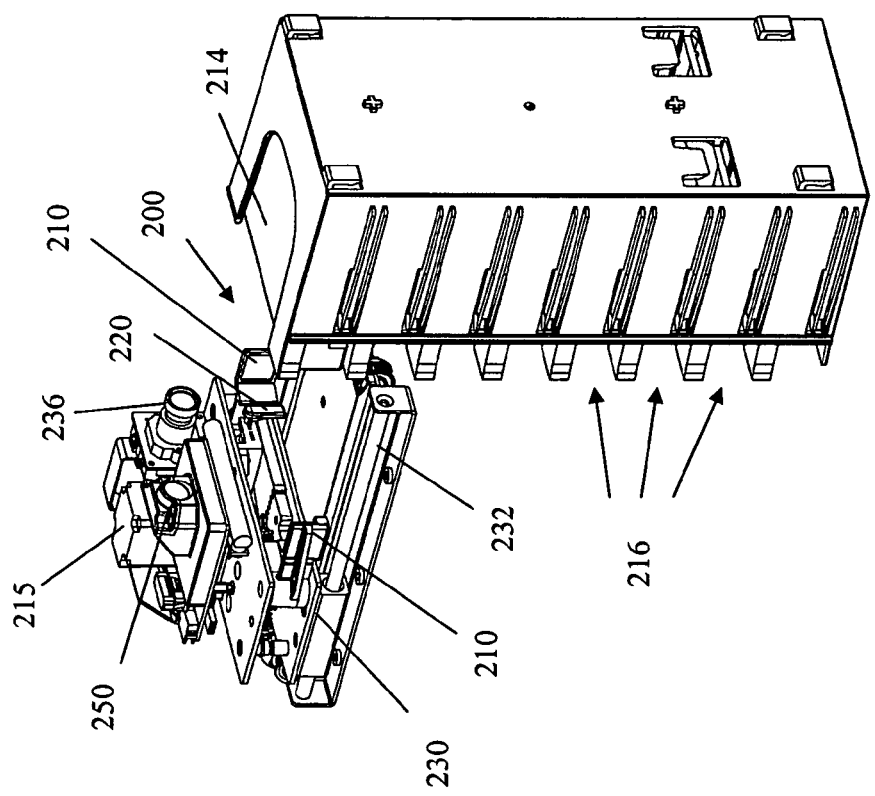
FIG. 2 illustrates an exemplary gripper assembly adjacent a column of storage slots.

FIG. 2 illustrates a detailed view of an exemplary robotic transport mechanism having a gripper assembly 200 adjacent a column of storage slots 216 including cartridge 214. A storage library may include any number of storage slots 216 arranged in various manners. For example, storage slots 216 may be angled down from a front opening to the back to more securely hold cartridges 214. One or more columns of storage slots 216 may be arranged along an interior cabinet of a library system that has flat or curved interior surfaces.

Gripper fingers 210 are attached to a picker frame 230 that may translate along support 232 towards cartridge 214. As gripper assembly 200 approaches a cartridge 214, gripper fingers 210 are in an open position such that cartridge 214 may fit between opposing surfaces of gripper fingers 210. Gripper assembly 200 may further include a cartridge detector 220 that contacts the opposing face of cartridge 214 and depresses or moves linearly relative to gripper fingers 210 and picker frame 230. In this example, cartridge detector 220 serves as a plunger with a large distal end configured to engage and be resilient against tape cartridge 214. Depressing cartridge detector 220 indicates to a controller, e.g., a system controller or gripper controller, the position of cartridge 214 relative to gripper fingers 210 and more generally gripper assembly 200. Cartridge detector may include several trip points, e.g., indicating a cartridge is approaching and a stop point where cartridge 214 is in suitable position for gripper fingers 210 to engage cartridge 214. Further, various non-contact cartridge detectors may also be used, such as optical or acoustical sensors, as known in the art.

In this example, gripper fingers 210 are arranged to engage the opposing minor side surfaces of cartridge 214, rather than the major (top and bottom) surfaces of cartridge 214. Gripper fingers 210 may include opposing planar surfaces to grip and frictionally hold cartridge 214 therebetween against gravity and acceleration during movements within a library system. This allows for storage cartridges to be stacked more densely within a storage library system because clearance above and below each cartridge may be reduced compared to conventional grippers that engage and support the bottom and/or top of cartridge 214 for transportation. The engagement of gripper fingers 210 on the opposing minor side surfaces of cartridge 214 is desirably sufficient to hold and transfer cartridge 214 in two or more dimensions without additional structures such as platforms or supports located below and supporting cartridge 214. In one example, however, a support platform is positioned below gripper fingers 210.

As described in greater detail below, gripper fingers 210 are coupled to each other through corresponding geared surfaces and may be driven by a single motor 215 acting to rotate a single gripper finger 210. Further, it is generally desired to know that gripper fingers 210 are in an open position prior to moving in to pick cartridge 214 to reduce the potential for damage to the gripper assembly 200 or cartridge 214. A sensor (not shown) may be used to indicate to a controller the position of gripper fingers 210, e.g., closed, open, or partially closed.

Gripper assembly 200 may further have various features known in the art such as a barcode scanner 250 and calibration camera 236. Barcode scanner may be used to read barcode labels affixed to cartridges 214 and calibration camera may be used to determine and store locations of storage bins 216 relative to gripper assembly 200. Additionally, further mechanisms such as pulleys, motors, and the like for vertical and horizontal translation may be included to move gripper assembly 200 within a storage library system.

Figure 3B:
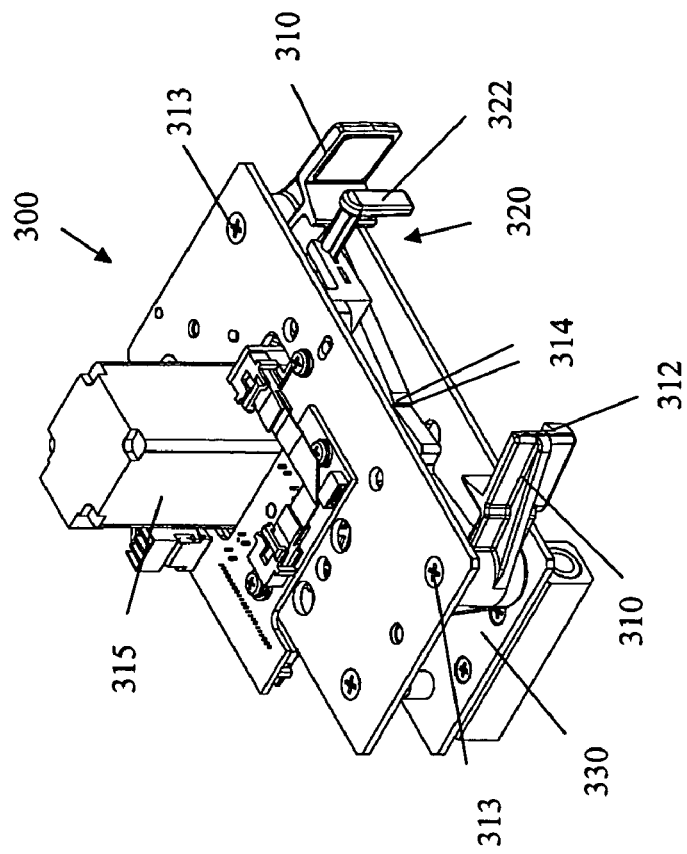
FIGS. 3A–3C illustrate an exemplary gripper assembly having opposing geared surfaces in a closed position, open position, and engaging a cartridge respectively.
Figure 3A:
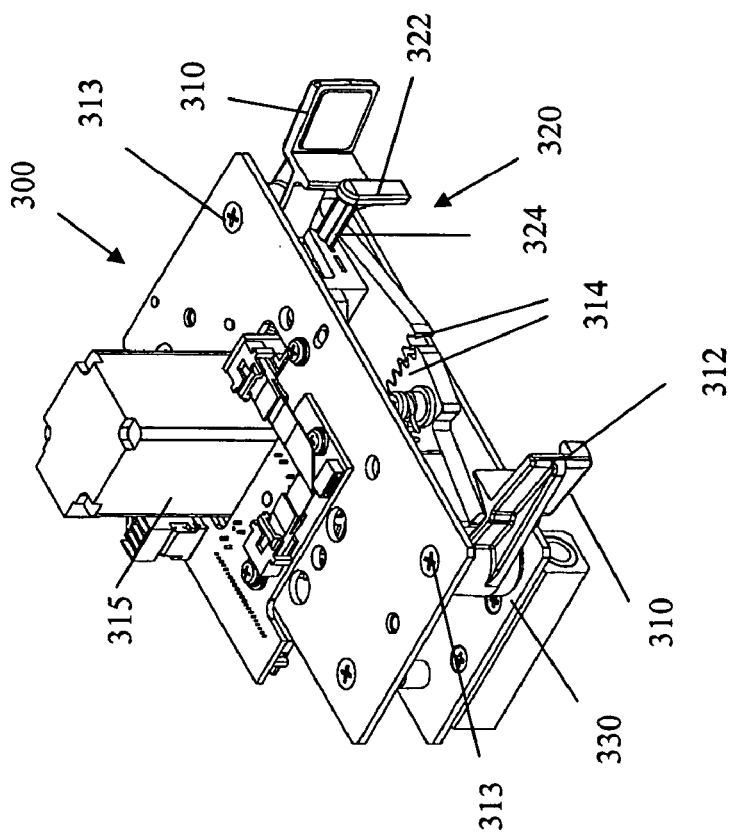
Figures 3C, 4:
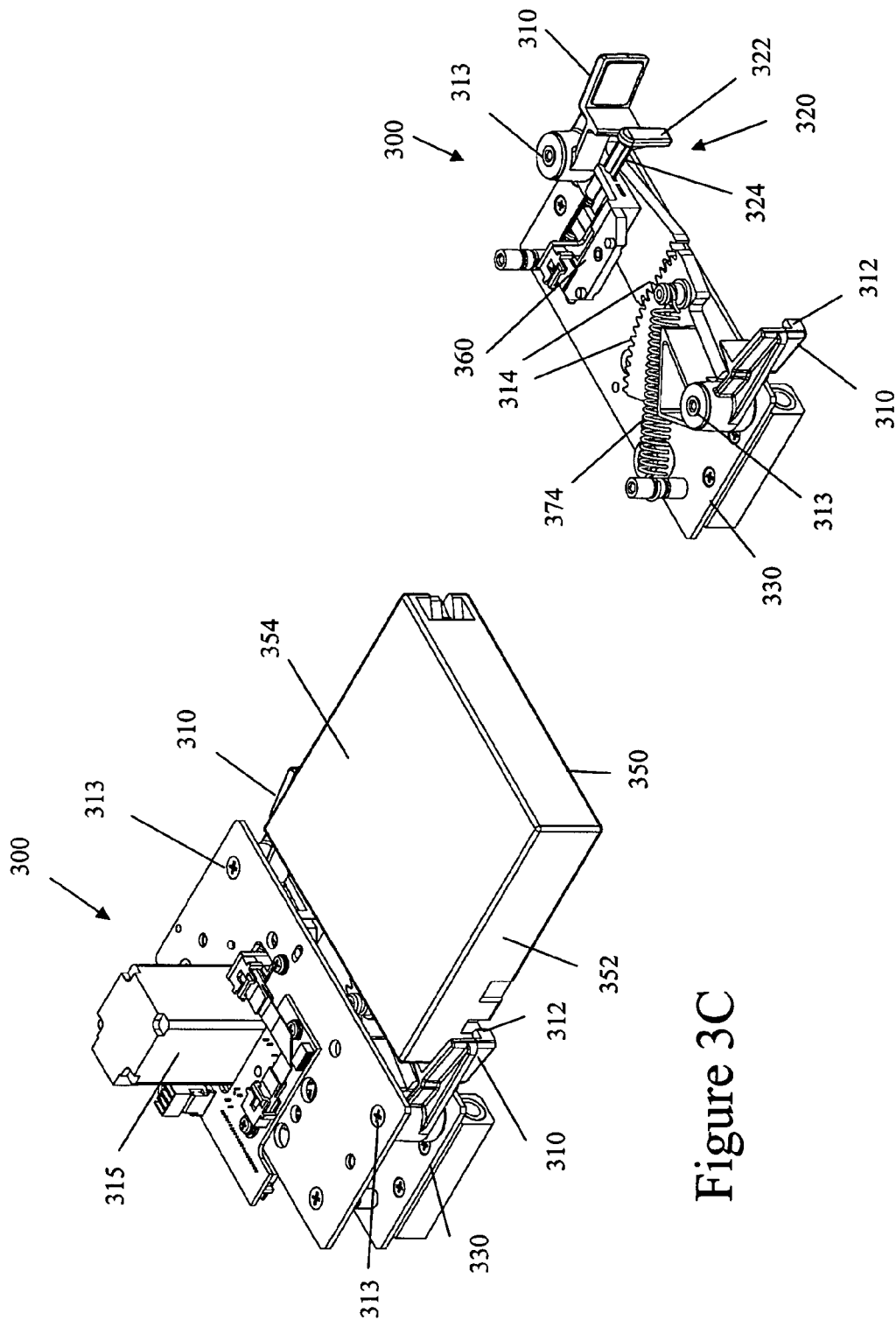
FIG. 4 illustrates an exemplary gripper mechanism having interconnected gripper fingers and a cartridge detector in greater detail.

With reference to FIGS. 3A–3C and 4, an exemplary gripper mechanism 300 is illustrated. FIGS. 3A–3C illustrate exemplary gripper assembly 300 including a motor 315 and gripper fingers 310 coupled through corresponding geared surfaces in a closed position, open position, and engaging a cartridge respectively. FIG. 4 illustrates the interaction between proximal ends of gripper fingers 310 in greater detail.

Preferably, gripper fingers 310 are rotatably attached to frame 330 such that distal ends thereof open and close to secure a tape cartridge 350 by engaging the cartridge housing on the opposing minor side surfaces 352. One of the gripper fingers 310 may further include a protrusion 312 extending from the generally planar surface to engage a corresponding notch or groove included in tape cartridge 350. Gripping a cartridge 350 by its minor side surface 352, or its shortest dimension, may reduce space lost in a library housing to allow a gripper mechanism access when picking a cartridge. For example, a gripper mechanism that grips a cartridge by the top and bottom surfaces will generally need clearance above and below the cartridge to move in above and below cartridge 350. Reducing the clearance above and below cartridges may increase the packing density of cartridges within the storage library.

Gripper fingers 310 are interconnected to a single actuator or motor 315. The proximal end of gripper fingers 310 may rotate and interact through toothed or geared surfaces 314 (seen more clearly in FIG. 4). Motor 315 rotates at least one of the gripper fingers 310 about rotation point 313 such that gripper fingers 310 rotate open or closed together through the geared surfaces 314. The proximal end of one of gripper fingers 310 may include a larger geared surface than the opposing gripper finger 310. The additional geared surface not coupled to the opposing gripper finger 310 may be coupled to and driven by motor 315 through one or more gears thereby rotating gripper fingers 310 together.

Alternatively, motor 315 may drive at least one of the gripper fingers 310 by other suitable methods. For example, motor 315 may move linearly to rotate gripper fingers 310. Motor 315 may include any suitable motor to create the rotational motion of gripper fingers 310. For example, a stepper motor, solenoid motor, or the like may be coupled through opposing gears to drive one gripper finger 310, which through geared surfaces 314, operates to open and close both gripper fingers 310 together. An exemplary stepper motor that may be used includes stepper motor PK224PA manufactured by Oriental Motors Corporation.

Gripper fingers 310 are preferably motor driven open and spring loaded or biased closed, e.g., by spring 374. This allows for a loss of system power, anticipated or unanticipated, while gripper fingers 310 hold a cartridge with the force provided by spring 374 or other biasing member(s) coupled to gripper fingers 310. Further, the cartridge may be manually removed without restoring power to the library system. In contrast, conventional gripper mechanisms often include a lead screw operable to open and close gripper fingers; however, such devices generally do not allow for manually opening the gripping fingers in the absence of power. Additionally, lead screw type gripper assemblies are generally slow in opening and closing processes compared to the present example and increase library access time.

Gripper fingers 310 may include integrally formed portions, e.g., injection molded pieces or the like, as well as multiple portions coupled together to interact during opening and closing processes. Various sized and shaped geared surfaces 314 are contemplated as well as various curvatures depending on the particular application. In this example, the geared surfaces 314 are on a curved surface of relatively high radius. In other examples, larger or smaller curved surfaces, or no curve at all, may be used in a similar fashion. Further, other similar interacting portions are possible such that gripper fingers 310 are rotatable together. The interaction between gripper fingers 310 through geared surfaces 314 may allow for a relatively lower profile gripper mechanism than conventional gripper mechanisms.

Gripper assembly 300 may further include a cartridge detector such as a physical or non-physical sensor. In one example, gripper assembly 300 has a cartridge detector 320 including a plunger or linearly translating member having a distal end 322 with a larger cross-sectional area measured perpendicular to the direction cartridge detector 320 extends than proximal end 324. Cartridge detector 320 may be included in a detector subassembly 360 (see FIG. 4) having one or more optical sensors configured to detect optical indicia disposed on the proximal end 324 of cartridge detector 320. Other sensors, such as a potentiometer and the like may also be used with a cartridge detector 320. Subassembly 360 may thereby determine when a cartridge is in a given position relative to gripper assembly 300 or gripper fingers 310.

Figure 5A:
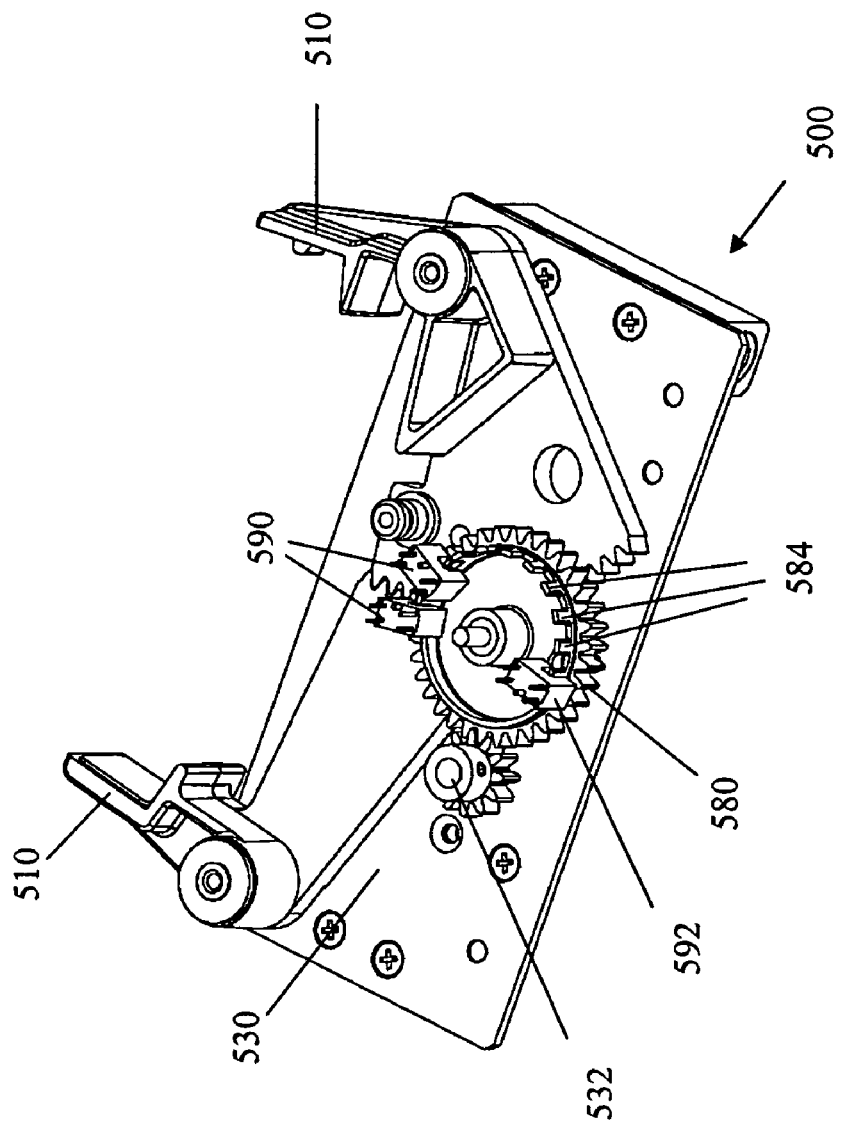
FIGS. 5A–5B illustrate an exemplary gripper assembly having optically detectable indicia associated with the position of opposing gripper fingers.
Figure 5B:
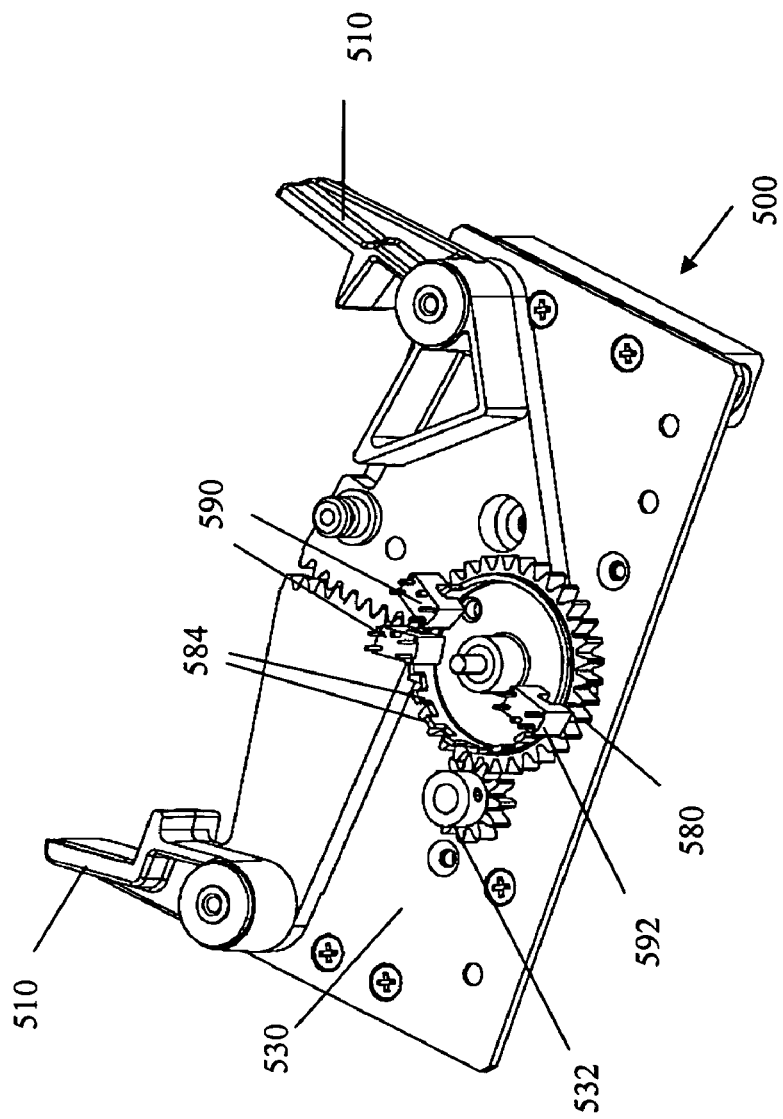
Figure 6:
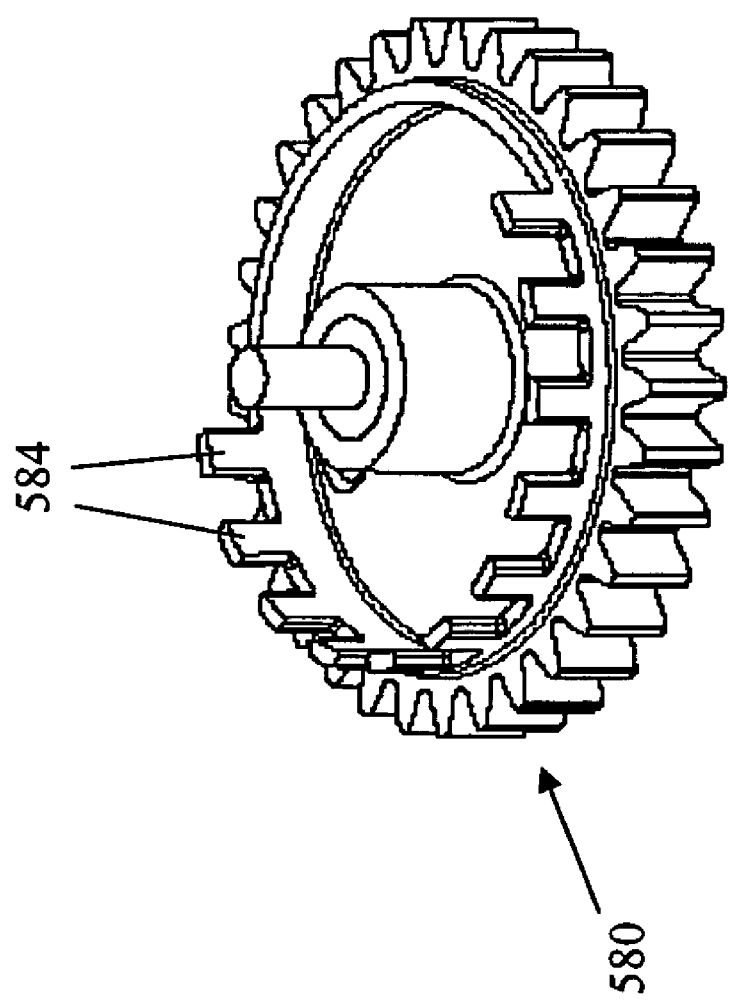
FIG. 6 illustrates an exemplary gear having optically detectable indicia disposed thereon.

FIGS. 5A and 5B illustrate an exemplary gripper assembly having optically detectable indicia 584 associated with the position and movement of gripper fingers 510, and FIG. 6, which may be referred to in conjunction with FIGS. 5A and 5B, illustrates an exemplary sensor ring 580 having optically detectable indicia 584 disposed thereon in greater detail.

In this example, optically detectable indicia 584 are included on a portion of an elliptical or curved ring with a castellated profile mechanically coupled or associated with gear 580 within the gripper mechanism 500 drive train. One or more optical sensors 590 are disposed such that the castellated profile forming optically detectable indicia 584 of gear 580 interrupts the optical beams of optical sensors 590 as gear 580 rotates. The configuration and relative position of the profile and sensors 590 allows sensors 590 to create signals for a processor or controller to determine, for example, the position, speed, and direction at which gripper fingers 510 are opening or closing, as well as whether the gripper fingers are in an open, closed, properly closed on a cartridge, or partially closed on a cartridge position.

A motor (not shown) rotates gear 532 coupled to gear 580. In this instance, gear 580 is coupled to or includes a geared surface to interact with the larger geared surface of gripper finger 510 (to the right in FIG. 5A). Different gear ratios may be used between the motor and gear 580 and between gear 580 and gripper fingers 510 depending on the particular application and design. Additionally, a motor may interact directly with gear 580 or gripper finger 510.

Gear 580 may also include a continuous ring with optically detectable indicia such as a pattern of reflective and non-reflective portions or transmissive and nontransmissive portions. An optical sensor may be positioned with a light source and detector on opposite sides (detecting transmission) of the sensor ring or on the same side (detecting reflection). Alternatively, one or more optical sensors may be disposed to detect the teeth of gear 580 directly to indicate position and/or velocity of gear 580. A portion of the teeth may further include reflective or non-reflective material.

In this example, gripper assembly includes two sensors 590 disposed adjacent each other to provide quadrature signals to a controller. Quadrature signals may provide the position of the sensor ring 580 as well as both the magnitude and direction of the movement of sensor ring 580 and gripper fingers 510. Optical sensors 590 are spaced approximately twice the pitch of the optical detectable indicia 584 to provide the quadrature signals, i.e., signals that are approximately 90° out of phase.

In this example, gear 580 rotates less than 180 degrees from a fully open position to a fully closed position. The optical indicia 584 are disposed to span a portion of gear 580, i.e., less than 360 degrees. A controller may initially rotate gear 580 back and forth a distance greater than the spacing of optical indicia 584 to determine the location of gear 580 and gripper fingers 510. For example, by determining that in one direction optical indicia 584 are no longer detected and the sensor 590 is near one end of the optical indicia 584, the system may determine that gripper fingers are fully open or closed. If sensors 590 are near the middle of the indicia, firmware or the like may issue an open or closed command to continue rotation in one direction until optical indicia 584 are no longer detected. If optical sensors 590 do not detect optical indicia 584 upon initial searching, the system may determine that an error has occurred, e.g., gripper fingers 510 are open or closed beyond desired limits. It should be recognized that in other applications and designs, optical indicia 584 may completely encircle gear 580.

In another example, an optical sensor 592 may be included to serve as a home sensor indicating when gripper fingers 510 are in the full open (or closed) position. For instance, a third optical sensor 592 (or first or second optical sensor depending on the particular application) may be included to serve as a home sensor indicating when the position of gripper fingers 510 and gear 580 are in a known position. For example, if gear 580 is found with optical indicia 584 located at optical sensors 590, i.e., near the middle of optical indicia 584, the system may be unsure of the position of gripper fingers 510. Firmware may issue an open command to rotate clockwise until the third or home optical sensor 592 detects an optical indicia 584 indicating to the system that the gripper fingers 510 are open.

Optical sensors 590 and 592 may be attached to a common structure, e.g., a circuit board, located above gripper fingers 510. Any suitable optical sensors, including separate optical sources and detectors are contemplated. An exemplary optical sensor includes a Transmissive Optical Sensor with Phototransistor Output (model TCST1030) manufactured by Vishay Intertechnology, Inc.; however, other suitable optical sensors may be used. It should be recognized that any number of optical sensors, e.g., one or more, may be used in conjunction with an optically detectable pattern associated with the position or movement of gripper fingers 510.

The above detailed description is provided to illustrate exemplary embodiments and is not intended to be limiting. It will be apparent to those skilled in the art that numerous modification and variations within the scope of the present invention are possible. Accordingly, the present invention is defined by the appended claims and should not be limited by the description herein.

The invention claimed is:

1. A mechanical gripper device for handling storage devices, comprising:
   a frame;
   a pair of opposing gripper fingers rotatably mounted to the frame, each having a distal end adapted to engage opposite minor side surfaces of a storage device and a proximal end having a geared surface spatially fixed with respect to the distal end, wherein
   the opposing gripper fingers are interconnected by the geared surfaces such that the gripper fingers rotate together, and
   a biasing member for biasing the distal ends of the opposing gripper fingers toward each other.

2. The device of claim 1, wherein proximal ends of the gripper fingers include geared surfaces that are directly coupled.

3. The device of claim 1, wherein the gripper fingers are driven by a single actuator.

4. The device of claim 3, wherein the actuator includes a stepper motor.

5. The device of claim 1, wherein the distal ends of the gripper fingers include opposing planar surfaces for engaging opposite minor side surfaces of a storage device.

6. The device of claim 5, wherein at least one of the gripper fingers includes a protrusion extending from the planar surface towards the opposing gripper finger for interacting with a storage device.

7. The device of claim 1, wherein the gripper fingers are biased closed.

8. The device of claim 1, wherein the biasing member comprises a spring.

9. A mechanical gripper device for handling storage devices, comprising:
   a frame;
   a pair of opposing gripper fingers rotatably mounted to the frame, each having a distal end adapted to engage opposite minor side surfaces of a storage device and a proximal end having a geared surface spatially fixed with respect to the distal end, wherein the opposing gripper fingers are interconnected by the geared surfaces such that the gripper fingers rotate together; and
   a cartridge detector extending away from the frame and movable at least partially between the pair of opposing gripper fingers, wherein the distal end of the cartridge detector has a larger cross-sectional area measured perpendicular to the direction the cartridge detector extends than the proximal end of the cartridge detector.

10. An automated storage library, comprising
a library controller;
storage bins for housing storage devices; and
a robotic cartridge picker mechanism for handling storage devices having:
a frame,
a pair of opposing gripper fingers rotatably mounted to the frame, each having a distal end adapted to engage opposite minor side surfaces of a storage device and a proximal end having a geared surface spatially fixed with respect to the distal end, and
a biasing member for biasing the distal ends of the opposing gripper fingers toward each other,
wherein the opposing gripper fingers are interconnected by the geared surfaces such that they rotate together.

11. The storage library of claim 10, wherein proximal ends of the gripper fingers include geared surfaces that are directly coupled.

12. The storage library of claim 10, wherein the gripper fingers are driven by a single actuator.

13. The storage library of claim 12, wherein the actuator includes a stepper motor.

14. The storage library of claim 10, wherein the distal ends of the gripper fingers include opposing planar surfaces for engaging opposite minor side surfaces of a storage device.

15. The storage library of claim 14, wherein at least one of the gripper fingers includes a protrusion extending from the planar surface towards the opposing gripper finger for interacting with a storage device.

16. The storage library of claim 10, wherein the gripper fingers are biased closed.

17. The storage library of claim 10, wherein the biasing member comprises a spring.

18. An automated storage library, comprising
a library controller;
storage bins for housing storage devices; and
a robotic cartridge picker mechanism for handling storage devices having:
a frame,
a pair of opposing gripper fingers rotatably mounted to the frame, each having a distal end adapted to engage opposite minor side surfaces of a storage device and a proximal end having a geared surface spatially fixed with respect to the distal end, wherein the opposing gripper fingers are interconnected by the geared surfaces such that they rotate together; and
a cartridge detector extending away from the frame and movable at least partially between the pair of opposing gripper fingers, wherein the distal end of the cartridge detector has a larger cross-sectional area measured perpendicular to the direction the cartridge detector extends than the proximal end of the cartridge detector.

19. A method for gripping storage cartridges with a gripper mechanism, comprising:
rotating a pair of opposing gripper fingers to engage opposing minor side surfaces of a storage device, wherein the pair of opposing gripper fingers are rotated together through corresponding geared surfaces associated with each gripper finger, the geared surfaces are spatially fixed with respect to each of the gripper fingers, and the distal ends of the opposing gripper fingers are biased toward each other.

20. The method of claim 19, wherein proximal ends of the gripper fingers include geared surfaces that are directly coupled.

21. The method of claim 19, further including activating a motor mechanically coupled to one of the geared surfaces to rotate the opposing gripper fingers.

22. The method of claim 21, wherein the motor includes a stepper motor.

23. The method of claim 19, wherein the distal ends of the gripper fingers include opposing planar surfaces for engaging opposite minor side surfaces of the storage device.

24. The method of claim 23, wherein at least one of the gripper fingers includes a protrusion extending from the planar surface towards the opposing gripper finger for interacting with a storage device.

25. The method of claim 23, wherein the gripper fingers are biased closed with sufficient force to hold a storage device.

26. The method of claim 23, wherein a biasing member comprises a spring providing sufficient force to hold a storage device between the opposing gripper fingers.

* * * * *